United States Patent
Saylor et al.

(10) Patent No.: US 11,383,575 B2
(45) Date of Patent: Jul. 12, 2022

(54) VARIABLE TIRE LATERAL LOAD TRANSFER DISTRIBUTION

(71) Applicant: GM GLOBAL TECHNOLOGY OPERATIONS LLC, Detroit, MI (US)

(72) Inventors: Brian K. Saylor, South Lyon, MI (US); Michael W. Neal, Fenton, MI (US); Larry G. Gepfrey, Fenton, MI (US); Robert G. Izak, Dryden, MI (US); Robert P. Marble, White Lake, MI (US); Hojjat Izadi, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 16/800,639

(22) Filed: Feb. 25, 2020

(65) Prior Publication Data
US 2021/0260952 A1 Aug. 26, 2021

(51) Int. Cl.
*B60G 21/055* (2006.01)
*B60G 21/00* (2006.01)

(52) U.S. Cl.
CPC ....... *B60G 21/0555* (2013.01); *B60G 21/005* (2013.01); *B60G 2202/25* (2013.01); *B60G 2202/42* (2013.01); *B60G 2202/43* (2013.01); *B60G 2204/62* (2013.01); *B60G 2400/0512* (2013.01); *B60G 2400/0521* (2013.01);
(Continued)

(58) Field of Classification Search
CPC .............. B60G 21/0555; B60G 21/005; B60G 2202/25; B60G 2202/42; B60G 2202/43; B60G 2204/62; B60G 2400/0512; B60G 2400/0521; B60G 2400/0523; B60G 2400/104; B60G 2400/106; B60G 2400/252; B60G 2400/61; B60G 2800/0122
See application file for complete search history.

(56) References Cited

U.S. PATENT DOCUMENTS 5,948,027 A * 9/1999 Oliver, Jr ........... B60G 17/0152
280/5.506
7,725,226 B2 * 5/2010 Urababa ............ B60G 21/0555
280/5.506
(Continued)

FOREIGN PATENT DOCUMENTS

EP 2186663 A2 * 5/2010 ......... B60G 17/0165
JP 2003154830 A * 5/2003
(Continued)

*Primary Examiner* — Paul N Dickson
*Assistant Examiner* — Kurtis Nielson
(74) *Attorney, Agent, or Firm* — Quinn IP Law

(57) ABSTRACT

A method of controlling relative roll torque in vehicles having a front active sway bar and a rear active sway bar is provided. The front active sway bar varies roll torque of a front axle and the rear active sway bar varies roll torque of a rear axle. The method includes monitoring dynamic driving conditions during operation of the vehicle and biasing tire lateral load transfer distribution (TLLTD) relative to the front axle based on the monitored dynamic driving conditions. Positive bias of the TLLTD increases the portion of a total roll torque carried by the front active sway bar. Biasing TLLTD occurs during one or more dynamic bias events triggered as monitored dynamic driving conditions exceed one or more calibrated thresholds.

13 Claims, 5 Drawing Sheets

(52) U.S. Cl.
CPC ........... *B60G 2400/0523* (2013.01); *B60G 2400/104* (2013.01); *B60G 2400/106* (2013.01); *B60G 2400/252* (2013.01); *B60G 2400/412* (2013.01); *B60G 2400/61* (2013.01); *B60G 2800/012* (2013.01); *B60G 2800/244* (2013.01); *B60G 2800/246* (2013.01)

(56) References Cited

U.S. PATENT DOCUMENTS

| | | | | |
|---|---|---|---|---|
| 7,949,446 | B2* | 5/2011 | Koumura | B60G 17/0182 |
| | | | | 701/38 |
| 8,050,818 | B2* | 11/2011 | Mizuta | B60W 10/184 |
| | | | | 701/72 |
| 8,170,749 | B2* | 5/2012 | Mizuta | B60G 21/0558 |
| | | | | 280/5.506 |
| 10,538,137 | B2* | 1/2020 | Fujita | B60G 21/0555 |
| 2007/0150144 | A1* | 6/2007 | Yasui | B60G 17/0162 |
| | | | | 701/38 |
| 2007/0271018 | A1* | 11/2007 | Hofmann | B60G 21/0555 |
| | | | | 701/69 |
| 2009/0112401 | A1* | 4/2009 | Miyajima | B60G 21/0553 |
| | | | | 701/38 |
| 2010/0102521 | A1* | 4/2010 | Hidaka | B60G 21/0553 |
| | | | | 280/5.508 |
| 2010/0318262 | A1* | 12/2010 | Mizuta | B60G 21/0558 |
| | | | | 701/38 |
| 2010/0324780 | A1* | 12/2010 | Koumura | B60G 21/0555 |
| | | | | 701/38 |
| 2011/0208391 | A1* | 8/2011 | Mizuta | B60G 21/0555 |
| | | | | 701/37 |
| 2013/0226405 | A1* | 8/2013 | Koumura | B60G 17/018 |
| | | | | 701/38 |
| 2019/0308611 | A1* | 10/2019 | Lee | B60W 40/101 |

FOREIGN PATENT DOCUMENTS

| | | | | |
|---|---|---|---|---|
| JP | 2007137165 A | * | 6/2007 | |
| WO | WO-2012029183 A1 | * | 3/2012 | ......... B60G 17/0162 |

\* cited by examiner

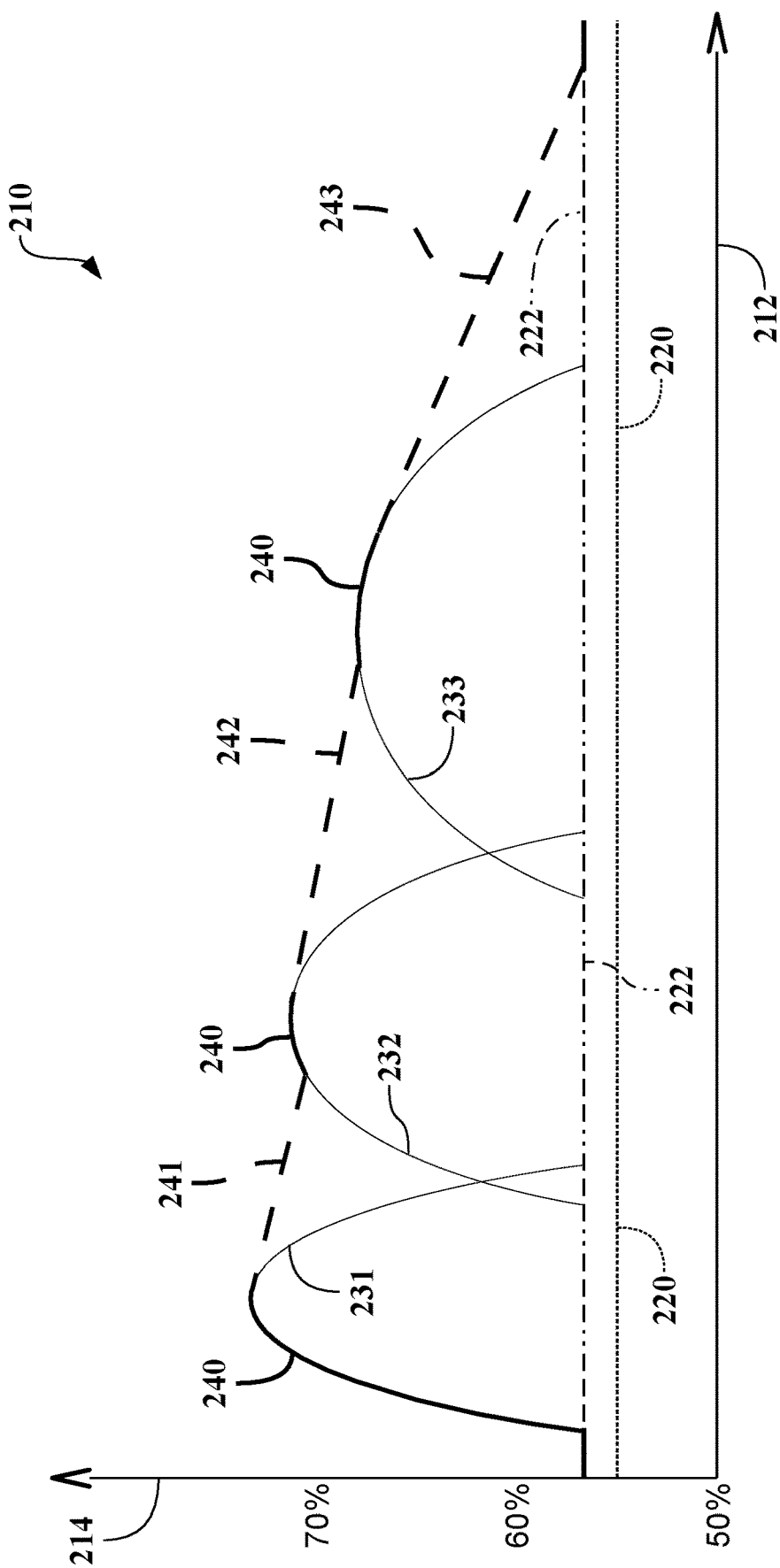

VARIABLE TIRE LATERAL LOAD TRANSFER DISTRIBUTION

INTRODUCTION

The present disclosure relates to mechanisms and methods for controlling anti-roll characteristics in a vehicle to improve handling agility and stability

SUMMARY

A method of controlling relative roll torque in vehicles having a front active sway bar and a rear active sway bar is provided. The front active sway bar varies roll torque of a front axle and the rear active sway bar varies roll torque of a rear axle.

The method includes monitoring dynamic driving conditions during operation of the vehicle and biasing tire lateral load transfer distribution (TLLTD) relative to the front axle based on the monitored dynamic driving conditions. Positive bias of the TLLTD increases the portion of a total roll torque carried by the front active sway bar. Increasing the effective roll torque of the front active sway bar and decreasing torque of the rear active sway bar biases TLLTD forward. Biasing TLLTD may occur during one or more dynamic bias events triggered as monitored dynamic driving conditions exceed one or more calibrated thresholds.

The method may include decaying the shifted TLLTD back to a steady-state base value after the one or more dynamic bias events decrease below a decay rate, and varying the total roll torque based on a driver mode setting having at least two modes. The method may also include monitoring loading conditions and ride height of the vehicle, and setting the TLLTD to a steady-state base value in response to the monitored loading conditions and monitored ride height. Biasing TLLTD during the one or more dynamic bias events shifts the TLLTD away from (and decays back to) the steady-state value.

The method may include any, all, or some of the following features: The monitored dynamic driving conditions include longitudinal acceleration and pitch, and implementing a longitudinal bias event by shifting the TLLTD when one of the longitudinal acceleration exceeds a calibrated threshold for longitudinal acceleration or the pitch exceeds a calibrated threshold for pitch.

The monitored dynamic driving conditions include roll velocity, and implementing a roll damping bias event by shifting the TLLTD when the roll velocity exceeds a calibrated threshold for roll velocity. The monitored dynamic driving conditions include steering wheel angle gradient (SWAG), and implementing a SWAG bias event by shifting the TLLTD when the SWAG exceeds a calibrated threshold SWAG.

The monitored dynamic driving conditions include driver intended lateral acceleration and measured lateral acceleration, and implementing a lateral acceleration bias event by shifting the TLLTD when one of the driver intended lateral acceleration exceeds a calibrated threshold for driver intended lateral acceleration or the measured lateral acceleration exceeds a calibrated threshold for measured lateral acceleration. The monitored dynamic driving conditions include oversteer and understeer, and implementing a yaw rate bias event by shifting the TLLTD when the oversteer exceeds a calibrated threshold for oversteer or when the understeer exceeds a calibrated threshold for understeer.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a schematic graph illustrating dynamic bias events and decay rates therefore.

DETAILED DESCRIPTION

Figure 1:
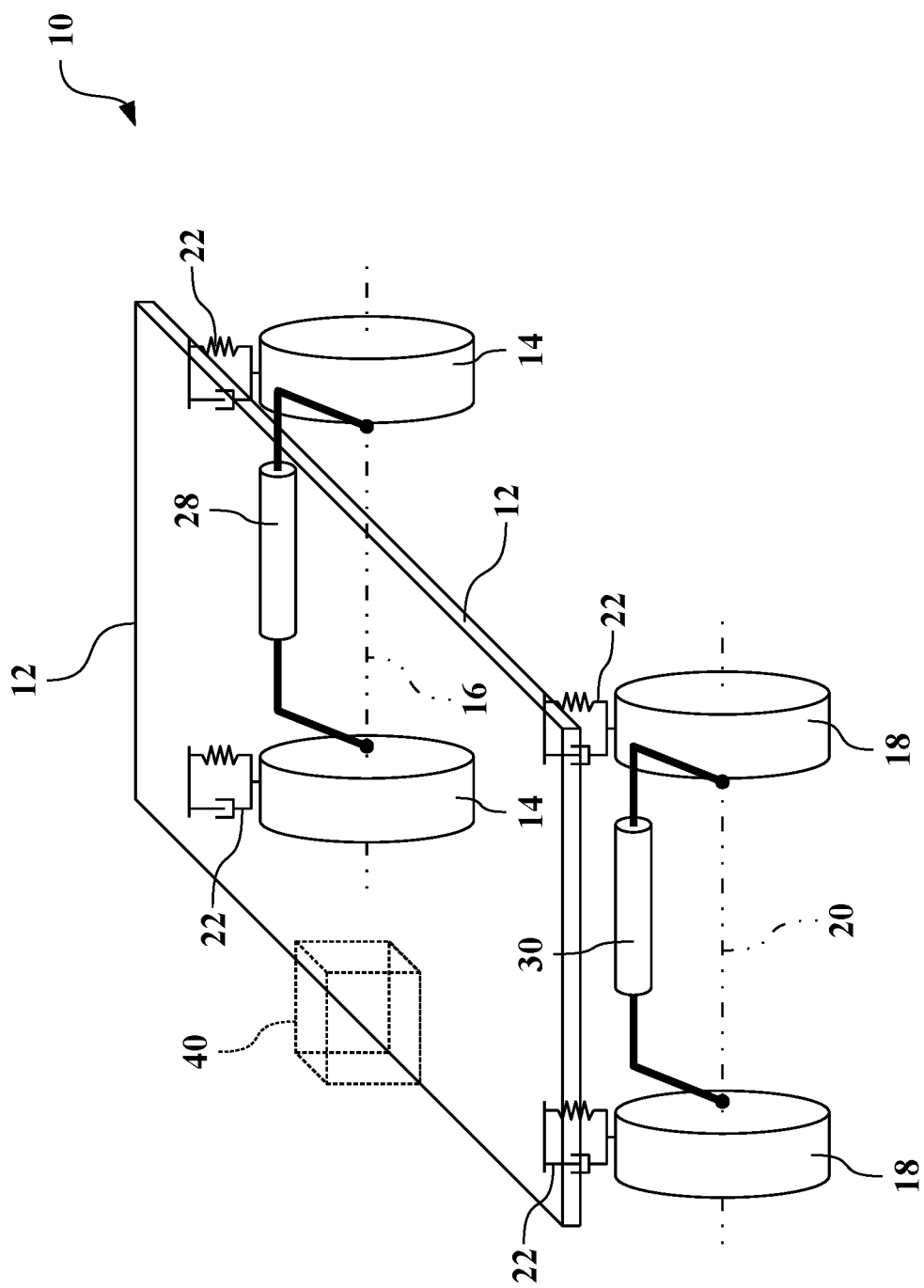
FIG. 1 is a schematic isometric diagrammatic view of a vehicle having active sway bars, which may be used to shift tire lateral load transfer distribution (TLLTD) between the front and rear axles.

Referring to the drawings, like reference numbers refer to similar components, wherever possible. FIG. 1 schematically illustrates a vehicle 10 capable of adjusting total roll torque and axial roll torque. Note that the vehicle 10 is shown highly schematically and is included only to illustrate basic principles of operation for a method of controlling and changing relative roll torque in the vehicle 10, or other vehicles.

The vehicle 10 includes a body 12 riding on two rear tires 14, which generally define a rear axle 16, and two front tires 18, which generally define a front axle 20. The body 12 is suspended by a plurality of suspension elements 22, which are shown schematically, and may each have one or more spring elements and one or more damper elements. Note that the suspension elements 22 are shown highly-schematically and are not representative of the entire suspension system.

A rear active sway bar 28 varies roll moment of, or carried by, the rear axle 16, and a front active sway bar 30 varies roll moment of, or carried by, the front axle 20. Either of the sway bars may alternatively be referred to as an anti-roll bar, a roll bar, an anti-sway bar, a stabilizer bar, a torsion beam, or other terminology recognizable by skilled artisans. The rear active sway bar 28 and the front active sway bar 30 contain actuators and connect suspension points associated with the left and right tires relative to the rear axle 16 and the front axle 20 respectively. Note that many of the suspension elements 22 may also be active, and that the roll torque characteristics of the rear axle 16 and the front axle 20 may be affected by the active suspension elements 22, in addition to the rear active sway bar 28 and the front active sway bar 30.

A control system 40 is operatively in communication with all necessary components of the vehicle 10. The control system 40 includes a non-generalized, electronic control device having a preprogrammed digital computer or processor, a memory or non-transitory computer readable medium used to store data such as control logic, instructions, lookup tables, etc., and a plurality of input/output peripherals or ports. The control system 40 is configured to implement or execute the control logic or instructions described herein.

Furthermore, the control system 40 may include, or be in communication with, a plurality of sensors, such as those used to sense position, movement, and/or loading conditions of the vehicle 10. The control system 40 may be dedicated to the specific aspects of the vehicle 10 described herein, or the control system 40 may be part of a larger control system that manages numerous functions of the vehicle 10.

The drawings and figures presented herein are not to scale and are provided purely for instructional purposes. Thus, any specific or relative dimensions shown in the drawings are not to be construed as limiting. The vehicle 10 may be representative of any rolling platform, including, without limitation: motorcycles, tractors, buses, mobile homes, campers, and tanks. Furthermore, the components described herein may also be used in a variety of other industries and applications, including, without limitation: aerospace applications, consumer goods, industrial and construction equipment, farm equipment, or heavy machinery.

While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term "substantially" refers to relationships that are ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

Lateral load transfer is the amount of change on the vertical loads of the tires due to the lateral acceleration imposed on the center of gravity (CG) of the vehicle 10. The lateral load transfer is affected by sway bars—in addition to other suspension components—which generally connect movement of the inside wheel to the outside wheel during a lateral maneuver, such as cornering or other evasive maneuvers.

Alternative vehicles may include passive, as opposed to active or adaptive, sway bars, which connect the wheels through a torsion spring. If the wheels move relative to each other, the passive sway bar is subjected to torsion and forced to twist. Each end of the passive sway bar is connected to an end link that connects to a spot near a wheel or the axle. As one wheel moves vertically relative to the other wheel on the same axle, the passive sway bar transfers part of the tire patch form from one side of a loaded axle to the opposite side.

Passive sway bars resist torsion through material stiffness, such that the torque required to twist passive sway bars cannot be altered, and the roll torque and stiffness of the front and rear axles is predetermined for such vehicles. The roll gradient provided by passive sway bars cannot be altered without changing the passive sway bars. Unlike a passive sway bar, where the axle torque from the passive sway bar is dependent on the wheel displacement, an active sway bar varies roll applies a roll moment to the axle using an actuator, and may allow fully independent movement of one tire relative to the other.

The total lateral load transfer is the summation of the lateral load transfer at the tire patch from the front axle 20 and the rear axle 16. Tire lateral load transfer distribution (TLLTD) is the ratio of the tire lateral load transfer handled by the front axle 20 with the remaining amount handled by the rear axle 16. Importantly, in the vehicle 10, the TLLTD can be adjusted by varying the roll torque outputs of the front active sway bar 30 and the rear active sway bar 28. Since the roll torque on the body of the vehicle 10 is the sum of the front and rear axle torques, it is possible to adjust the TLLTD without changing the vehicle's steady state roll angle in a turn. Varying or shifting the TLLTD alters the relative portion of the total roll torque, and therefore lateral load transfer, carried by the front active sway bar 30 and the rear active sway bar 28. Since each sway bar is only a portion of the total roll torque provided by the suspension on each axle, it is possible that the torque changes in the front active sway bar 30 and the rear active sway bar 28 will not be the same magnitude (but opposite in direction). It is also possible for one of the sway bars torques to be negative.

In the example of the vehicle 10, varying TLLTD varies the portion of the total roll torque handled by the front active sway bar 30 and the portion of the total roll torque handled by the rear active sway bar 28. For example, shifting the TLLTD toward the front (usually TLLTD greater than 50%) increases the torque carried by the front active sway bar 30 and decreases the torque carried by the rear active sway bar 28. Alternatively stated, increasing the torque carried by the front active sway bar 30 and decreasing the torque carried by the rear active sway bar 28 shifts the TLLTD forward. Vehicles having passive sway bars cannot alter the effects on TLLTD provided by the sway bars without changing the passive sway bars installed on the vehicle.

Figure 2A:
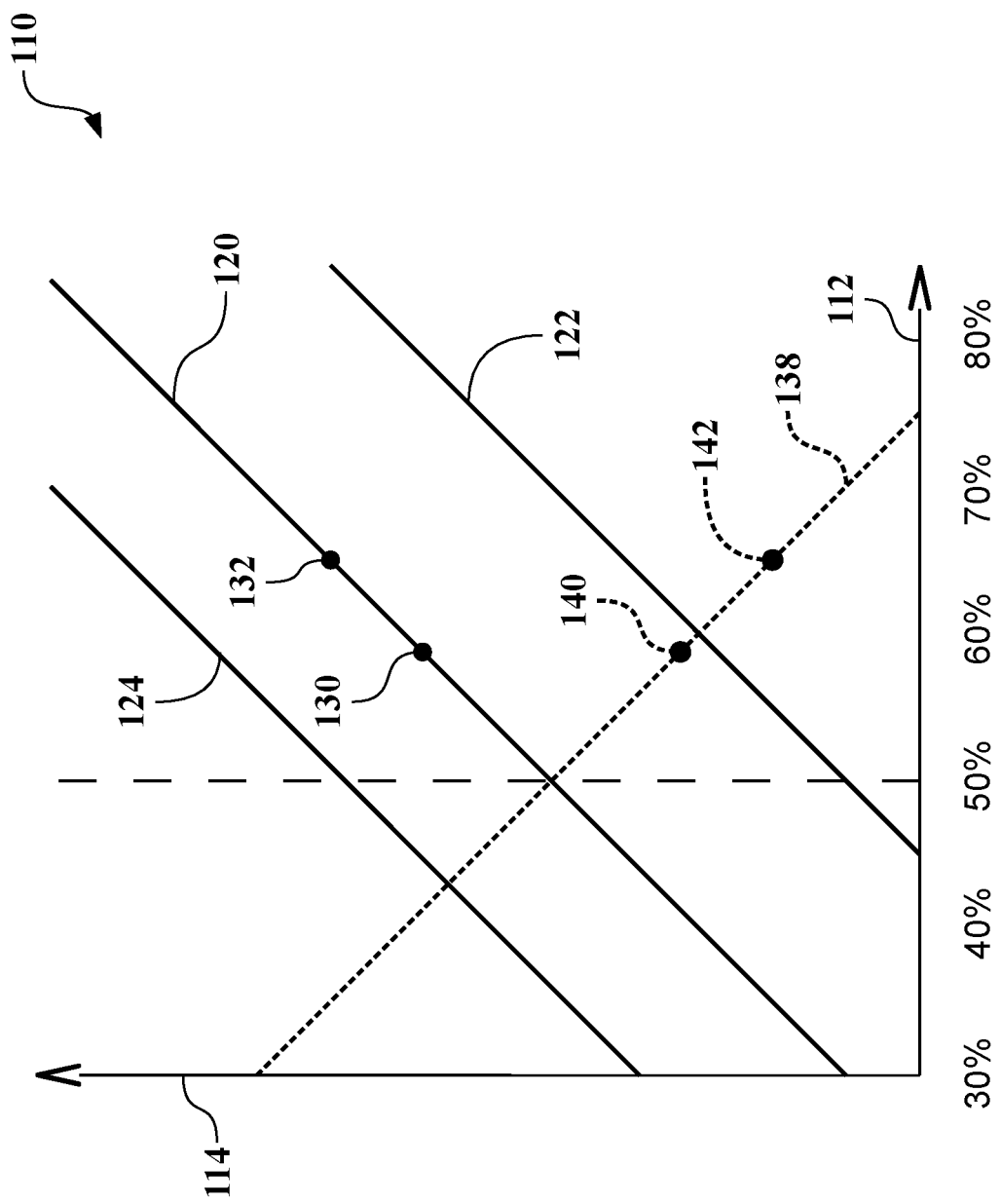
FIG. 2A is a schematic graph illustrating front axial torque versus TLLTD at varying levels of fixed total roll torque.
Figure 2B:
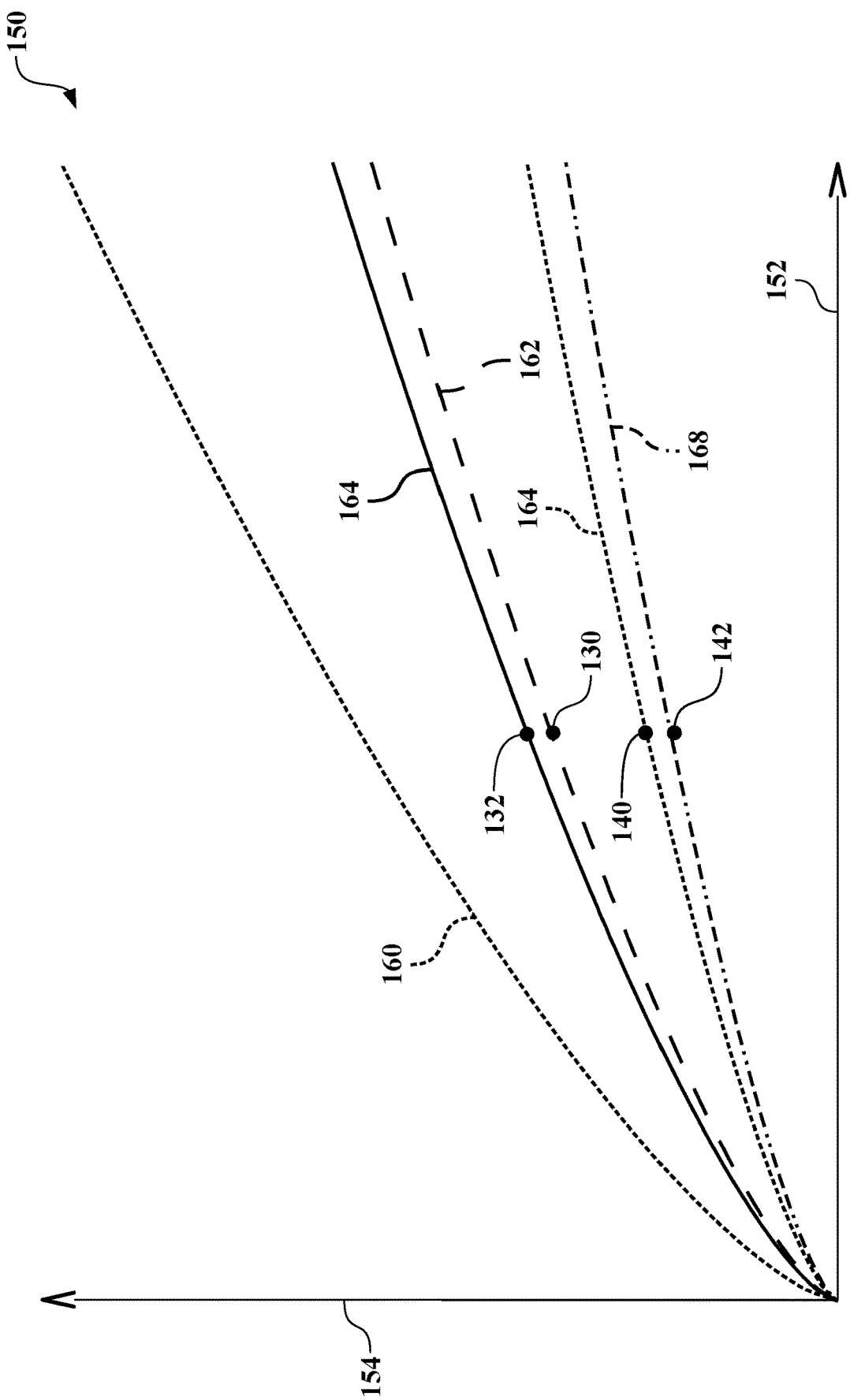
FIG. 2B is a schematic graph illustrating front and rear axial torque versus lateral acceleration, with increasing total roll torque.

Referring to FIG. 2A and FIG. 2B, and with continued reference to FIG. 1, there is shown a schematic graph 110 illustrating the effects of shifting or changing TLLTD on axial torque, particularly the front axle 20. FIG. 2B shows a schematic graph 150 illustrating front and rear axial torque versus lateral acceleration, with continually variable total roll torque. Portions of FIGS. 2A and 2B, and subsequent figures, may be described relative to the vehicle 10. However, vehicles with other configurations and other components may utilize the techniques, methods, or algorithms described herein.

In FIG. 2A, an x-axis 112 represents TLLTD, which generally does not have units. Higher values of TLLTD represent higher amounts of roll torque placed onto the front active sway bar 30—i.e., front-biased TLLTD. Note that the 50% level on the x-axis 112 is marked with a dashed line and represents equal roll torque carried by the front axle 20 and the rear axle 16. A y-axis 114 represents front roll torque at the respective TLLTD ratio.

The control system 40 monitors dynamic driving conditions during operation of the vehicle 10. Using the monitored dynamic driving conditions, the control system 40 may shift the TLLTD and the roll torque split between the front axle 20 and the rear axle 16. The TLLTD can be increased by increasing the roll torque on the front axle 20 with the front active sway bar 30 and reducing the torque on the rear axle 16 with the rear active sway bar 28. Similarly, the TLLTD can be decreased by decreasing the roll torque on the front axle 20 with the front active sway bar 30 and increasing the roll torque on the rear axle 16 with the rear active sway bar 28.

For example, during dynamic maneuvers or events, such as those used to avoid obstacles when the vehicle 10 is moving, handling stability may be improved by biasing the TLLTD toward the front axle 20. Therefore, the control system 40 may shift the TLLTD forward, such that the front active sway bar 30 causes the front axle 20 to carry more of the total roll torque than under steady-state conditions.

Dynamic events refer to transient, quick-changing, occurrences, such as unexpected driving maneuvers in response to moving obstacles or weather conditions on roadways. Contrarily, steady-state events refer to continuous occurrences that are changing less frequently, such as loading on the axles of the vehicle 10 or changing the ride height and, therefore, center of gravity (CG), which may be controlled by driving mode settings. Driver mode settings may also be incorporated into both the dynamic and the steady-state conditions.

Further, static conditions refer to estimated load and balance settings, such as those set at the factory and which are not regularly altered, if at all. Generally, the static conditions are the same conditions—at least with regard to the sway bars—that would always be in place for vehicles having passive, as opposed to active, sway bars. Some vehicles with passive sway bars may have other active suspension elements.

The graph 110 includes three different fixed total roll torque or torque settings or levels (note that all levels shown in the figures are only examples). A medium torque 120 may be a default setting for the vehicle 10, which is used under most driving conditions. A low torque 122 may be used to provide a smoother ride for the vehicle 10, particularly for luxury vehicles or for touring driver modes. A high torque 124 may be used to improve handling capabilities, such as for sport or track driver modes. The fixed total torque settings are shown only as examples, and may apply when the vehicle 10 is not corning.

Each of the three fixed total torque settings illustrated in FIG. 2A may be chosen by the control system 40 or may be selected by a driver of the vehicle 10, such as through selectable driving modes that communicate the driver's intended driving style. In many configurations, there will be at least three different selectable driver modes. For example, the selectable driver modes that may affect total roll torque, may include, without limitation: touring, sport, track, or weather. Additionally, note that the control system 40 may increase the total roll torque as the vehicle 10 corners (this is illustrated in FIG. 2B), such that there may effectively be a gradient between the three example levels of total roll torque illustrated in FIG. 2A.

Biasing TLLTD will be illustrated on the graph 110 relative to the medium torque 120. The TLLTD may be set by the control system 40 at a steady-state point 130, which is approximately 60%, as a result of loading conditions of the vehicle 10. However, when the control system 40 expects, for example, an upcoming hard cornering maneuver, it may be beneficial to move the TLLTD forward to a dynamic point 132, which is approximately 65%. Note that any of the specific levels of TLLTD given herein are only examples and are not limiting.

At the steady-state point 130, the front axle 20 is carrying substantially 60% of the total roll torque of the vehicle 10. However, at the dynamic point 132, the front axle 20 is carrying substantially 65% of the total roll torque or torque of the vehicle 10. This change is affected by increasing the effective torque of the front active sway bar 30 and decreasing the effective torque of the rear active sway bar 28. In some configurations, other suspension elements 22 may also adjust to alter TLLTD.

Note that the rear axle 16 is carrying the remaining amount of total roll torque in each of the cases above, as the total TLLTD always equals one, such that: Rear TLLTD=1−Front TLLTD. Generally, the TLLTD ratios given represent front bias, such that any ratio greater than 50% is forward.

The graph 110 also illustrates one example of rear roll torque, a rear medium torque line 138. A rear steady-state point 140 shows the rear roll torque when the front roll torque is at the steady-state point 130, and a rear dynamic point 142 shows the rear roll torque when the front roll torque is at the dynamic point 132. Note that, because the front bias of the TLLTD increases between the steady-state point 130 and the dynamic point 132, the rear roll torque at the rear dynamic point 142 is less than at the rear steady-state point 140. As a percentage of total roll torque, the rear steady-state point 140 is approximately 40% and the rear dynamic point 142 is approximately 35%.

As explained herein, biasing the TLLTD forward to the dynamic point 132 will be a temporary change, and the TLLTD will eventually (often quickly) return to the steady-state point 130. The front active sway bar 30 and the rear active sway bar 28 can change or vary the effective torque between the sides of the respective axles. By increasing the torque response of the front active sway bar 30 or the rear active sway bar 28, the resistance to roll or relative displacement across the respective axle is increased, and load transfer between the front tires 18 or the rear tires 14 is increased.

Skilled artisans will recognize different types of active sway bars that may be used with the techniques described herein. Possible examples include, without limitation, sway bars that have one or more electric motors or actuators in the bar, possibly in combination with gear systems, which are then able to selectively apply opposing torque on either end—i.e., to drive either the left or the right tire upward or downward in response to vehicle conditions. Increasing the torque of one of the active sway bars increases the force per displacement of that active sway bar.

In the graph 150 of FIG. 2B, an x-axis 152 represents lateral acceleration or roll angle, which may be expressed in gravitational units (g's) or radians. Higher values of lateral acceleration or roll angle generally mean that the vehicle 10 is changing direction at a greater pace. A y-axis 154 represents axial roll torque at the respective tire patches of the vehicle 10.

A total torque line 160 represents the total roll torque being produced by the vehicle 10. As the lateral acceleration or roll angle increases, the total roll torque at the front axle 20 and the rear axle 16 also increases in order to counteract that movement. A steady-state front line 162 represents the front roll torque being produced relative to the front axle 20 during steady-state operation, and a steady-state rear line 164 represents the rear roll torque being produced relative to the rear axle 16 during steady-state operation.

Note that this is only an example, and some vehicles may have different responses (such as different curve shapes) to the total roll torque in response to lateral acceleration or roll angle. Passive sway bars may also increase the applied torque as the roll angle increases, because the spring force of the passive sway bar increases with displacement.

Along any vertical line—i.e., at any constant lateral acceleration—the combined value of the steady-state front line 162 and the steady-state rear line 164 equals the total torque line 160. On the steady-state front line 162 and the steady-state rear line 164, the TLLTD is approximately 60%, such that the front axle 20 is carrying 60% of the total torque and the rear axle 16 is carrying 40% of the total torque. Therefore, the steady-state point 130 and the rear steady-state point 140 from FIG. 2A are illustrated in FIG. 2B and represent movement between steady-state conditions and dynamic conditions at a fixed level of total torque.

However, during dynamic events, the control system 40 may shift the TLLTD to, for example and without limitation, 65%. Therefore, a dynamic front line 166 represents the front roll torque being produced relative to the front axle 20 during dynamic TLLTD shifts, and a dynamic rear line 168 represents the rear roll torque being produced relative to the rear axle 16 during dynamic TLLTD shifts. Example reasons for shifting to the dynamic front line 166 and the dynamic rear line 168 are discussed in more detail relative to FIGS. 3 and 4.

The dynamic point 132 and the rear dynamic point 142 from FIG. 2A are also illustrated in FIG. 2B. During the dynamic TLLTD shifts, the front axle 20 is carrying 65% of the total torque, as illustrated by the increase from the steady-state front line 162 to the dynamic front line 166, and the rear axle 16 is carrying 35% of the total torque, as illustrated by the decrease from the steady-state rear line 164 to the dynamic rear line 168.

These dynamic shifts may last for only a few seconds or less (possibly fractions of a second). Note that the combined value of the dynamic front line 166 and the dynamic rear line 168 still equals the total torque line 160, as the shifted front and rear TLLTD always adds up to one. Vehicles having passive sway bars are unable to use those passive sway bars to change between the steady-state front line 162 and the dynamic front line 166, or between the steady-state rear line 164 and the dynamic rear line 168. Note that the different levels of total torque response could also be illustrated by moving the total torque line 160 upward or downward, such as based on the selected driving mode.

Referring to FIG. 3, and with continued reference to FIGS. 1-2B, there is shown a schematic graph 210 illustrating implementation of TLLTD shifts in response to bias events. An x-axis 212 represents time lapse. A y-axis 214 represents front bias of the TLLTD. Note that the lowest point on the y-axis 214 is 50%, as the graph 210 is illustrating bias events that cause the TLLTD to shift forward. However, other bias events may cause the TLLTD to shift toward the rear axle 16—i.e., front bias that is less than 50%.

The graph 210 illustrates a calibrated static value 220, which is approximately 55%. The calibrated static value 220 is determined based on standard conditions, such as the factory setup of the vehicle 10. For example, the vehicle 10 may be a mid-sized SUV, with a front engine and an all-wheel-drive powertrain. When the static balance has more weight located toward the front of the vehicle 10, the calibrated static value 220 may be biased toward the front axle 20, such that vehicles with front engines are likely to have a calibrated static value 220 of greater than 50% TLLTD. The calibrated static value 220 may be representative of the TLLTD that would be set by, and unchangeable with, passive sway bars.

The graph 210 also illustrates a steady-state value 222, which is approximately 57%. The steady-state value 222 is determined based on, without limitation, loading conditions, ride height, and driver mode settings of the vehicle 10. As described above, steady-state conditions are changeable, but less transient than dynamic conditions. The control system 40 monitors loading conditions and ride height of the vehicle 10. For example, the mid-sized SUV may have cargo and occupants within the vehicle 10 and may have an adjustable ride height setting based whether the vehicle 10 is driving in the city or on the highway. These conditions may be used by the control system 40 to adjust the TLLTD to the steady-state value 222.

Selectable driver modes may include, without limitation: touring, sport, track, or weather. These modes may be selected by the driver, such as through an input system of the vehicle 10, or by the control system 40, such as by analyzing driving behavior or road conditions. Driver modes may alter numerous aspects of the vehicle 10, such as, without limitation: engine, transmission, and suspension responses (including TLLTD settings).

The steady-state value 222 operates as the base value—from which the dynamic shifts may be made—while the vehicle is in operation, as it better reflects current conditions of the vehicle 10 than the calibrated static value 220. While driving, the control system 40 monitors dynamic driving conditions to determine whether additional TLLTD bias is needed in response to dynamic events, and shifts the TLLTD away from the steady-state value 222 accordingly. Alternatively, some configurations may shift the TLLTD away from the calibrated static value 220, without first calculating the steady-state value 222. Furthermore, note that the steady-state value 222 may overlap or equate to the calibrated static value 220 when the steady-state conditions resemble that of the factory set up.

When specific monitored conditions of the vehicle 10 exceed calibrated thresholds, the control system 40 implements one or more bias events by shifting the TLLTD. The graph 210 demonstrates implementation of three different, but possibly related, dynamic bias events, along with respective dedicated decay rates for returning the TLLTD to the steady-state value 222.

A first bias event 231, a second bias event 232, and a third bias event 233 partially overlap, such that the control system 40 will select and/or blend which of the events are causing front-bias of the TLLTD, and how to transition therebetween, as shown by an implemented TLLTD 240 (represented partially as a thick line and partially as a thick dashed line, such that it is formed from several different segments). As the first bias event 231 occurs, the implemented TLLTD 240 is shifted away from the steady-state value 222.

The monitored dynamic driving conditions causing the first bias event 231 determine the magnitude and duration of the shift to the TLLTD. As the conditions move further beyond the respective threshold, the magnitude of the TLLTD shift increases. The amount of time during which the conditions exceed the respective threshold determines the duration of the dynamic bias event. As discussed below, the first bias event 231 may be the result of steering wheel angle gradient (SWAG) crossing a threshold.

However, as the first bias event 231 peaks and then begins to decrease, instead of snapping the implemented TLLTD 240 quickly toward the steady-state value 222, the control system 40 applies a first decay rate 241. Therefore, the implemented TLLTD 240 is decayed at the first decay rate 241 toward the steady-state value 222 after the rate of change of the first bias event 231 decreases below the first decay rate 241.

As the second bias event 232, which represents a different monitored driving condition crossing a threshold, occurs, the TLLTD for that event dynamically moves away from the steady-state value 222. However, the implemented TLLTD 240 is not affected until the magnitude of the second bias event 232 intersects the first decay rate 241, which is part of the implemented TLLTD 240. As the second bias event 232 rises above the first decay rate 241, the implemented TLLTD 240 is increased until the rate of change of the second bias event 232 decreases to below a second decay rate 242. As discussed below, the second bias event 232 may be the result of intended lateral acceleration crossing a threshold.

Similarly, as the third bias event 233, which represents another monitored driving condition crossing its threshold, occurs, the TLLTD for that event moves away from the steady-state value 222. The implemented TLLTD 240 is not affected until the magnitude of the third bias event 233 intersects the second decay rate 242. The implemented TLLTD 240 is increased along the third bias event 233 until the rate of change of the third bias event 233 decreases to below a third decay rate 243. As discussed below, the third bias event 233 may be the result of measured lateral acceleration crossing a threshold. The first decay rate 241, the second decay rate 242, and the third decay rate 243 form part of the implemented TLLTD 240, but these portions are shown as dashed segments in FIG. 3 to illustrate the individual decay segments.

Each of the first decay rate 241, the second decay rate 242 and the third decay rate 243 may have its own event-specific decay rate. Alternatively, in some configurations, several bias events may share the same decay rate. In most configurations, including that illustrated in FIG. 3, there are at least two different decay rates.

Note that the decay rates may be decaying back toward the steady-state value 222 from either front bias or rear bias, depending on the TLLTD shift implemented by the bias event. Additionally, mode selection may alter the decay rates. For example, and without limitation, track mode may utilize different decay rates than touring mode.

Figure 4:
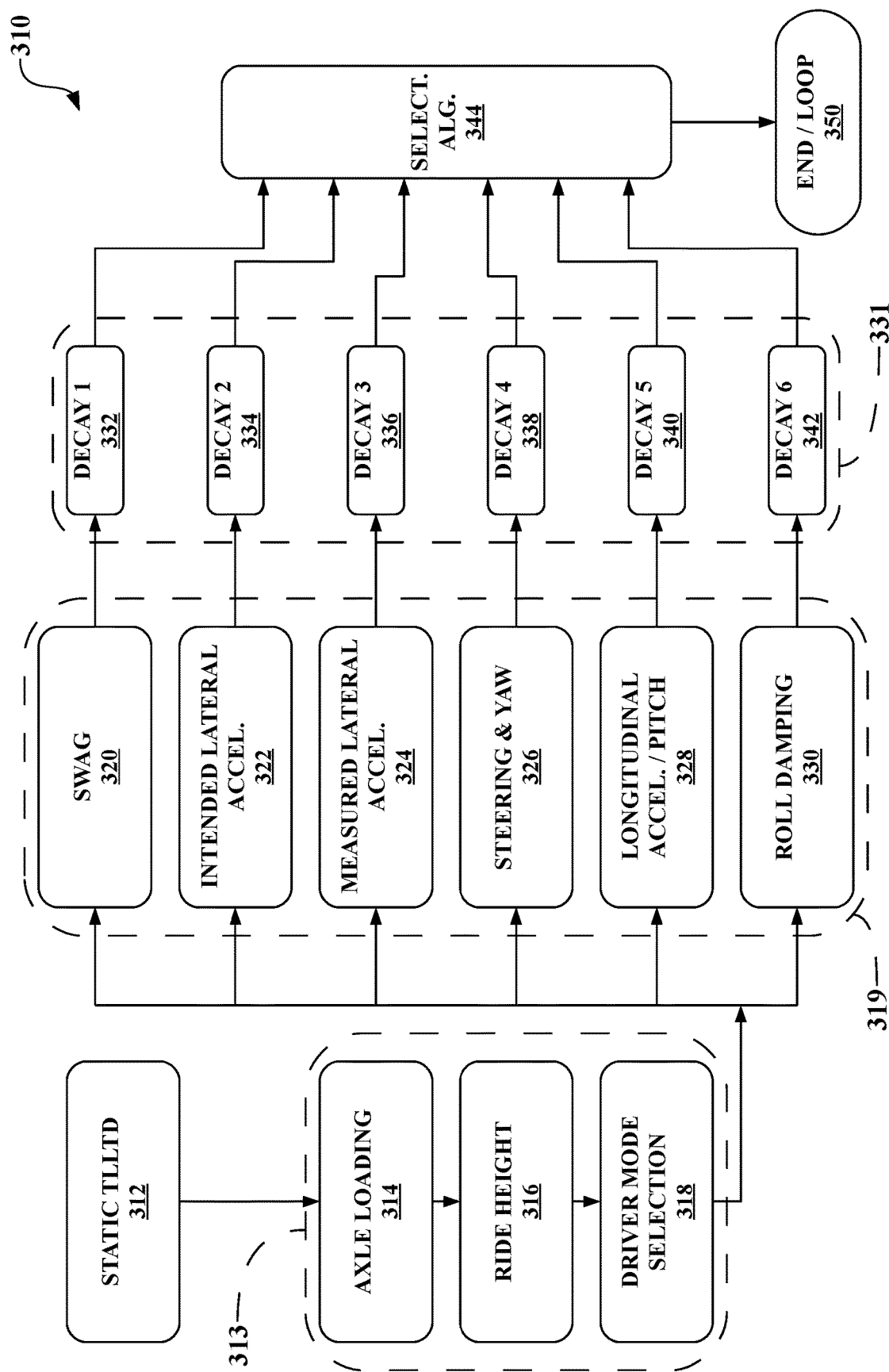
FIG. 4 is a schematic flow diagram illustrating steady-state and dynamic inputs, along with decay functions, for shifting TLLTD.

Referring to FIG. 4, and with continued reference to FIGS. 1-3, there is shown a schematic diagram of a flow process 310 illustrating implementation and determination of TLLTD shifts in response to a plurality of example dynamic bias events. Several of the dynamic bias events, and other elements, illustrated in FIG. 4 may correspond to those illustrated in FIG. 3 or referenced relative to the other figures.

A calibratable static TLLTD 312 may be the factory set TLLTD and operates as the base level from which the control system 40 may shift the TLLTD based on either steady-state or dynamic conditions. The calibratable static TLLTD may generally correspond to the calibrated static value 220 illustrated in FIG. 3.

The flow process 310 then determines steady-state TLLTD in a steady-state block 313. The control system 40 analyzes, for example, and without limitation: axle loading 314, which accounts for how loads on the vehicle 10 are distributed between the rear axle 16 and the front axle 20; ride height 316, which may be raised or lowered based on driving conditions; and driver mode selection 318, such as touring, sport, track, or weather modes. The total of these steady-state TLLTD adjustments may generally provide the steady-state value 222 illustrated in FIG. 3, which can then be modified based on monitored dynamic driving conditions giving rise to dynamic bias events.

Implementation of axle loading 314 and ride height 316 to alter the steady-state TLLTD may occur through an algorithm implemented by the control system 40, as would be recognized by skilled artisans. For example, calibrated factors may be applied to the sensed loads on each of the rear axle 16 and the front axle 20 to determine whether those loads are significantly greater than the static loads on those axles, and then shift TLLTD accordingly. Similarly, a calibrated value may be applied to changes in the ride height, which alters the center of gravity and roll center of the vehicle, particularly due to driver mode selection or ride height adjustments made by the control system 40 due to driving conditions (e.g., lowering ride height on the highway). When used herein, calibrated values may refer to fixed values, or to two-dimensional or three-dimensional values determined, for example, and without limitation, via lookup tables.

The flow process 310 then proceeds to determine whether to implement, and the magnitude of, dynamic bias events in a dynamic block 319. Note that the dynamic bias events shown in FIG. 4 and discussed herein are not exclusive, and additional dynamic bias events may be used to shift TLLTD. Furthermore, not all of the dynamic bias events shown and discussed need to be implemented on the example vehicle 10 by the control system 40.

The monitored dynamic driving conditions include steering wheel angle gradient (SWAG). The SWAG is the velocity of movement of the steering wheel, as opposed to the position of the steering wheel. Therefore, elevated SWAG may occur prior to the vehicle 10 experiencing any actual movement, but likely indicates forthcoming cornering or rolling movement. When the SWAG exceeds a calibrated threshold SWAG, the control system 40 implements a SWAG bias event 320. If the SWAG bias event 320 is sufficiently high in magnitude, relative to any other bias events and/or their decay rates, the control system 40 will implement the SWAG bias event 320 to shift the TLLTD.

Implementation of the SWAG bias event 320 may occur through an algorithm implemented by the control system 40, as would be recognized by skilled artisans. For example, the control system 40 may multiply the SWAG times the vehicle speed times a calibrated value to determine the amount of shift in TLLTD.

The monitored dynamic driving conditions also include driver expected or intended lateral acceleration and measured lateral acceleration. Furthermore, these conditions may include changes in the rates of intended or measured lateral acceleration. When the driver intended lateral acceleration exceeds a calibrated threshold intended lateral acceleration, the control system 40 implements an intended lateral bias event 322. Similarly, when the measured lateral acceleration exceeds a calibrated threshold measured lateral acceleration, the control system 40 implements a measured lateral bias event 324. Additionally, the control system 40 may compare the measured lateral acceleration to the expected lateral acceleration in order to determine whether additional TLLTD shifts are needed to improve handling.

When the vehicle 10 makes an evasive maneuver, such as to make a late exit to an off ramp, the driver quickly moves the steering wheel, which may trigger the SWAG bias event 320. As the SWAG indicates that the driver intends to quickly turn the vehicle 10, the control system 40 may calculate that the driver intended lateral acceleration will increase, which triggers the intended lateral bias event 322 after the SWAG bias event 320. Similarly, the driver intended lateral acceleration suggests that the vehicle 10 will soon experience actual lateral acceleration, which, if measured or sensed by the control system 40, will trigger the measured lateral bias event 324. SWAG is a pseudo-derivative of driver intended lateral acceleration, and driver intended lateral acceleration is a pseudo-derivative of measured lateral acceleration.

These three bias events—the SWAG bias event 320, the intended lateral bias event 322, and the measured lateral bias event 324—may also be the three bias events illustrated in FIG. 3, as these three are likely to occur consecutively. The SWAG bias event 320 may be the first bias event 231, the intended lateral bias event 322 may be the second bias event 232, and the measured lateral bias event 324 may be the third bias event 233 of FIG. 3. Note, however, that the relative magnitudes of each bias event need not be the same as that shown in FIG. 3—for example, in some circumstances the measured lateral bias event 324 (the third bias event 233 in FIG. 3) may be greater than either the SWAG bias event 320 or the intended lateral bias event 322.

Implementation of the intended lateral bias event 322 and the measured lateral bias event 324 may occur through an algorithm implemented by the control system 40, as would be recognized by skilled artisans. For example, the control system 40 may determine the expected lateral acceleration by multiplying the vehicle speed by the steering wheel angle and compare that to the measured lateral acceleration to determine whether the TLLTD shift is needed. Similarly, the control system 40 may compare the measured lateral acceleration to a calibrated value to determine whether TLLTD shift is needed to improve handling.

In addition to measuring lateral acceleration, the control system 40 may be measuring or sensing yaw and yaw rate. This may be used to determine whether the vehicle 10 is experiencing understeer (veering to the outside of a planned corning path) or oversteer (veering to the inside of a planned corning path). In some configurations, the control system may only look at yaw rate when measured lateral acceleration is beyond a calibrated threshold.

When either the oversteer exceeds a calibrated threshold for oversteer or when the understeer exceeds a calibrated threshold for understeer, the control system 40 implements a yaw rate bias event 326. If the yaw rate bias event 326 is sufficiently high in magnitude, relative to any other bias events and/or their decay rates, the control system 40 will implement the yaw rate bias event 326 to shift the TLLTD.

Note that the yaw rate bias event 326 may be used to shift TLLTD in either direction, toward the rear axle 16 or the front axle 20. Increasing the front bias of the TLLTD, by increasing the portion of the total roll torque carried by the front axle 20, increases the likelihood that the vehicle 10 will understeer. Similarly, increasing the rear bias (or decreasing the front bias) of the TLLTD, by increasing the portion of the total roll torque carried by the rear axle 16, increases the likelihood that the vehicle 10 will oversteer. Therefore, shifting the TLLTD may be used to correct excessive yaw rates that cause either understeer or oversteer.

The monitored dynamic driving conditions may also include longitudinal acceleration and pitch or dive (negative pitch). The longitudinal acceleration may be measured longitudinal acceleration or driver intended (requested) longitudinal acceleration. Positive and negative (braking) acceleration may also result in pitch and dive, which changes the height of the rear axle 16 and the front axle 20. Note that the pitch/dive change in axle height is a dynamic condition, such that it is different from changes occurring due to vehicle loading, which is a steady-state condition.

When the longitudinal acceleration exceeds a calibrated threshold for longitudinal acceleration or the pitch exceeds a calibrated threshold for pitch, the control system 40 implements a longitudinal bias event 328. If the longitudinal bias event 328 is sufficiently high in magnitude, relative to any other bias events and/or their decay rates, the control system 40 will implement the longitudinal bias event 328 to shift the TLLTD. Note that the calibrated threshold for longitudinal acceleration and the calibrated threshold for pitch may be in both positive and negative directions.

Implementation of the longitudinal bias event 328 may occur through an algorithm implemented by the control system 40, as would be recognized by skilled artisans. For example, the control system 40 may multiply a calibrated value by the demanded longitudinal acceleration to determine the amount of TLLTD shift needed to improve handling. Similarly, the control system 40 may multiply a calibrated value by a filtered average axle displacement (front and/or rear) to determine the TLLTD shift for pitch/dive.

The monitored dynamic driving conditions may also include roll velocity, the rate at which the roll angle of the vehicle 10 as changing—as differentiated from the roll angle referenced with respect to FIG. 2B. When the roll velocity exceeds a calibrated threshold roll velocity, the control system 40 implements a roll damping bias event 330. If the roll damping bias event 330 is sufficiently high in magnitude, relative to any other bias events and/or their decay rates, the control system 40 will implement the roll damping bias event 330 to shift the TLLTD.

Roll damping acts against the direction of the roll motion—the faster the roll velocity, the larger the damping forces needed to damp that roll velocity. The roll damping bias event 330 captures the intention of the driver to turn and anticipates the effect of that intention on vehicle roll by looking at the SWAG, vehicle speed, and current roll rate. The roll damping bias event 330 then uses the front active sway bar 30 and the rear active sway bar 28 to compensate for unwanted vehicle motion—i.e., excessive roll rate—to provide a better ride quality.

Implementation of the roll damping bias event 330 may occur through a logic set or algorithm implemented by the control system 40. For example, the SWAG may be held for a calibrated time and then cross-referenced with vehicle speed in a look up table to determine a damping gain. The estimated or measured roll rate multiplied by the damping gain results in a damping moment, which is used to dynamically shift the TLLTD to the front or rear.

The flow process 310 then proceeds to decay the individual dynamic bias events in a decay block 331. The SWAG bias event 320 decays at a first decay rate 332; the intended lateral bias event 322 decays at a second decay rate 334; and the measured lateral bias event 324 decays at a third decay rate 336. Similarly, the yaw rate bias event 326 decays at a fourth decay rate 338; the longitudinal bias event 328 decays at a fifth decay rate 340; and the roll damping bias event 330 decays at a sixth decay rate 342.

In FIG. 4, each dynamic bias event is illustrated with its own, dedicated, decay rate. However, some of the decay rates for the individual bias events could be shared with other bias events. In many configurations, there will be two or more different decay rates, as different dynamic bias events may be more, or less, likely to be followed by other bias events or handling may benefit from different decay rates following some of the dynamic bias events.

The decay rates may be thought of as filters. The decay rates will only apply when the rate (i.e., the first derivative of the respective dynamic TLLTD) of an individual dynamic bias event drops below its respective decay rate.

The flow process 310 next moves to a selection algorithm 344. For example, and without limitation, each of the output TLLTD shifts from the decay block 331 will be compared and the maximum chosen for implementation (a maximum selection algorithm). For front bias events, the selection algorithm 344 will chose the largest value, such as 71% over 65%. Note, however, that the selection algorithm 344, when selecting the maximum value, may select based on the difference from 50%. For example, rearward bias is more significant at 40% than 45%—therefore, at least where there are no forward bias TLLTD shifts (greater than 50%), the selection algorithm 344 may choose the 40% value for TLLTD output.

Additionally, the decay rates may not have kicked in, such that the selection algorithm 344 may be looking at the actual bias events. For example, during the early portions of the first bias event 231 in FIG. 3, the selection algorithm 344 would not be affected by any decay rates. Furthermore, note that other blending or selection algorithms, in addition to the simple maximum, may be used within the scope of the techniques described herein.

The selection algorithm 344 outputs the shifted TLLTD to an end/loop block 350. The control system 40 implements the shifted TLLTD, and then either ends the flow process 310 or loops it again.

The flow process 310 may run only when specifically called, may be constantly running, or may be looping iteratively, such as on a time schedule. The end/loop block 350 may go back to the calibratable static TLLTD 312, to the steady-state block 319, or directly into the dynamic block 319. Alternatively, there may be a loop process in which the flow process 310 re-checks the steady-state block 313 periodically, but less often than it runs through the dynamic block 319. For example, the flow process 310 may loop through the dynamic block 319 around 100 times per second, but only loop through the steady-state block 313 around 10 times per second or every few seconds, in order to save computational resources, as the elements of the steady-state block 313 are less likely to change rapidly.

The detailed description and the drawings or figures are supportive and descriptive of the subject matter herein. While some of the best modes and other embodiments have been described in detail, various alternative designs, embodiments, and configurations exist.

Furthermore, any embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling relative roll torque in a vehicle having a front active sway bar, which varies roll torque of a front axle, and a rear active sway bar, which varies roll torque of a rear axle, comprising:
 monitoring dynamic driving conditions during operation of the vehicle;
 shifting tire lateral load transfer distribution (TLLTD) between the front axle and the rear axle of the vehicle based on the monitored dynamic driving conditions,
 wherein shifting the TLLTD toward the front axle increases a portion of a total roll torque carried by the front active sway bar;
 wherein shifting the TLLTD toward the rear axle increases a portion of the total roll torque carried by the rear active sway bar;
 wherein the monitored dynamic driving conditions include steering wheel angle gradient (SWAG), and implementing a first bias event by shifting the TLLTD when the SWAG exceeds a calibrated threshold SWAG;
 wherein the monitored dynamic driving conditions include driver intended lateral acceleration and measured lateral acceleration, and implementing a second bias event by shifting the TLLTD when the driver intended lateral acceleration exceeds a calibrated threshold for driver intended lateral acceleration or when the measured lateral acceleration exceeds a calibrated threshold for measured lateral acceleration;
 setting the TLLTD to a steady-state base value;
 shifting the TLLTD away from the steady-state base value during one of the bias events, in response to the monitored dynamic driving conditions;
 decaying the shifted TLLTD back to the steady-state base value after a rate of change of one of the bias event decreases below a decay rate;
 wherein each of the bias events has a dedicated decay rate, and
 wherein there are at least two different dedicated decay rates.

2. The method of claim 1, further comprising:
 setting the TLLTD to a static value, based on factory setup of the vehicle, and wherein setting the TLLTD to the steady-state base value includes:
 monitoring loading conditions of the vehicle; and
 monitoring ride height of the vehicle; and
 altering the TLLTD from the static value to the steady-state base value, in response to the monitored loading conditions and ride height.

3. The method of claim 2, further comprising:
 varying the total roll torque based on a driver mode setting having at least three different modes.

4. The method of claim 3, wherein the monitored dynamic driving conditions include oversteer or understeer, and further comprising:
 implementing a third bias event by shifting the TLLTD when the oversteer exceeds a calibrated threshold for oversteer or when the understeer exceeds a calibrated threshold for understeer.

5. The method of claim 4, wherein the monitored dynamic driving conditions include roll velocity, and further comprising:
 implementing a fourth bias event by shifting the TLLTD when the roll velocity exceeds a calibrated threshold for roll velocity, such that the roll velocity is damped.

6. A method of controlling relative roll torque in a vehicle having a front active sway bar, which varies roll torque of a front axle, and a rear active sway bar, which varies roll torque of a rear axle, comprising:
 monitoring dynamic driving conditions during operation of the vehicle; and
 biasing tire lateral load transfer distribution (TLLTD) relative to the front axle based on the monitored dynamic driving conditions, wherein positive bias of the TLLTD increases a portion of a total roll torque carried by the front active sway bar, and wherein biasing TLLTD occurs during one or more dynamic bias events triggered as monitored dynamic driving conditions exceed one or more calibrated thresholds;

decaying the biased TLLTD back to a steady-state base value after the one or more dynamic bias events decreases below a decay rate;
varying the total roll torque based on a driver mode setting having at least two modes;
monitoring loading conditions of the vehicle;
monitoring ride height of the vehicle; and
setting the TLLTD to the steady-state base value in response to the monitored loading conditions and monitored ride height,
wherein biasing TLLTD during the one or more dynamic bias events shifts the TLLTD away from the steady-state value.

7. The method of claim 6, wherein the monitored dynamic driving conditions include longitudinal acceleration and pitch, and further comprising:
implementing a longitudinal bias event by shifting the TLLTD when one of the longitudinal acceleration exceeds a calibrated threshold for longitudinal acceleration or the pitch exceeds a calibrated threshold for pitch.

8. The method of claim 6, wherein the monitored dynamic driving conditions include roll velocity, and further comprising:
implementing a roll damping bias event by shifting the TLLTD when the roll velocity exceeds a calibrated threshold for roll velocity.

9. The method of claim 6, wherein the monitored dynamic driving conditions include steering wheel angle gradient (SWAG), and further comprising:
implementing a SWAG bias event by shifting the TLLTD when the SWAG exceeds a calibrated threshold SWAG.

10. The method of claim 6, wherein the monitored dynamic driving conditions include driver intended lateral acceleration and measured lateral acceleration, and further comprising:
implementing a lateral acceleration bias event by shifting the TLLTD when one of the driver intended lateral acceleration exceeds a calibrated threshold for driver intended lateral acceleration or the measured lateral acceleration exceeds a calibrated threshold for measured lateral acceleration.

11. The method of claim 6, wherein the monitored dynamic driving conditions include oversteer and understeer, and further comprising:
implementing a yaw rate bias event by shifting the TLLTD when the oversteer exceeds a calibrated threshold for oversteer or when the understeer exceeds a calibrated threshold for understeer.

12. A method of controlling relative roll torque in a vehicle having a front active sway bar, which varies roll torque of a front axle, and a rear active sway bar, which varies roll torque of a rear axle, comprising:
monitoring dynamic driving conditions during operation of the vehicle;
shifting tire lateral load transfer distribution (TLLTD) between the front axle and the rear axle of the vehicle based on the monitored dynamic driving conditions, wherein shifting the TLLTD toward the front axle increases a portion of a total roll torque carried by the front active sway bar, and wherein shifting the TLLTD toward the rear axle increases a portion of the total roll torque carried by the rear active sway bar;
setting the TLLTD to a steady-state base value;
shifting the TLLTD away from the steady-state base value during one or more bias events, in response to the monitored dynamic driving conditions; and
decaying the shifted TLLTD back to the steady-state base value after the one or more bias events decreases below a decay rate,
wherein each of the one or more bias events has a dedicated decay rate, and
wherein there are at least two different dedicated decay rates.

13. The method of claim 12, further comprising:
setting the TLLTD to a static value, based on factory setup of the vehicle, and wherein setting the TLLTD to the steady-state base value includes:
monitoring loading conditions of the vehicle; and
monitoring ride height of the vehicle; and
altering the TLLTD from the static value to the steady-state base value, in response to the monitored loading conditions and ride height.

* * * * *